United States Patent
Behrens

[11] Patent Number: 6,102,795
[45] Date of Patent: *Aug. 15, 2000

[54] FILLER BOX FOR THE GRAIN TANK OF HARVESTERS

[76] Inventor: Kelly Behrens, P.O. Box 246, Albert City, Iowa 50510

[*] Notice: This patent issued on a continued prosecution application filed under 37 CFR 1.53(d), and is subject to the twenty year patent term provisions of 35 U.S.C. 154(a)(2).

[21] Appl. No.: 09/104,574

[22] Filed: Jun. 25, 1998

[51] Int. Cl.⁷ ..................................................... A01F 12/60
[52] U.S. Cl. ........................... 460/119; 414/502; 460/903
[58] Field of Search ................... 460/119, 901, 460/902, 903, 23; 414/502, 505

[56] References Cited

U.S. PATENT DOCUMENTS

| | | | |
|---|---|---|---|
| 3,391,778 | 7/1968 | Lasiter | 198/536 |
| 3,460,698 | 8/1969 | Harris | 414/526 |
| 3,823,819 | 7/1974 | Bakke | 209/12 |
| 4,093,087 | 6/1978 | DeCoene | 214/83.26 |
| 4,248,248 | 2/1981 | De Busscher et al. | 130/27 HA |
| 4,274,426 | 6/1981 | Williams | 130/27 T |
| 5,516,253 | 5/1996 | Linscheid et al. | 414/519 |
| 5,584,640 | 12/1996 | Johnson | 414/502 |
| 5,615,989 | 4/1997 | Matousek et al. | 414/502 |
| 5,695,398 | 12/1997 | Carlson et al. | 460/119 |
| 5,695,399 | 12/1997 | Carlson et al. | 460/119 |
| 5,733,094 | 3/1998 | Bergkamp et al. | 414/526 |
| 5,788,055 | 8/1998 | Stewart et al. | 198/671 |
| 5,830,062 | 11/1998 | Schwinn et al. | 460/902 |

FOREIGN PATENT DOCUMENTS

| | | | |
|---|---|---|---|
| 405130808 | 5/1993 | Japan | 460/119 |
| 405336837 | 12/1993 | Japan | 460/119 |
| 1524846 | 11/1989 | U.S.S.R. | 460/119 |
| 1630657 | 2/1991 | U.S.S.R. | 460/119 |
| 1632386 | 3/1991 | U.S.S.R. | 460/119 |

*Primary Examiner*—Thomas B. Will
*Assistant Examiner*—Arpad Fabian Kovacs
*Attorney, Agent, or Firm*—Kent A. Herink; Daniel A. Rosenberg; Davis Brown Law Firm

[57] ABSTRACT

A filler block for clean grain tanks of grain harvesters which prevents the trapping of grain and other materials in the grain tank. The filler block fills the dead spaces of the grain tank where grain and other materials may be trapped and presents a top surface which sheds grain and other materials to ensure that all such materials are conveyed out of the clean grain tank upon emptying. The filler blocks eliminate the need for manual cleaning and extend the life of the grain tank.

4 Claims, 4 Drawing Sheets

FILLER BOX FOR THE GRAIN TANK OF HARVESTERS

BACKGROUND OF THE INVENTION

1. Field of the Invention

The invention relates generally to harvesters for grain and, more specifically, to filler blocks to be added to the clean grain tanks of harvesters to assist in complete emptying of grain from the grain tank.

2. Background of the Prior Art

Mechanized harvesters and/or combines are in wide use in the agricultural industry for the cutting, reaping and thrashing of grains, including corn, wheat, soybeans, oats, and the like. The harvesters include a clean grain tank in which grain that has been collected and thrashed by the harvester is stored on a temporary basis until it is off-loaded to a wagon, grain truck, or similar conveyance for transport to a remote location. The clean grain tanks are typically positioned at a high location on the harvester and have bottom surfaces which slope toward a collection or discharge auger. Gravity in combination with the vibrations and movement of the harvester act to move the grain from the perimeter of the grain tank toward the discharge auger. Certain harvesters, however, have structures in the clean grain tank which can act to trap grain and prevent its further movement toward the discharge auger. While this small amount of grain does not substantially interfere with the ongoing operations of the combine during a harvest season, grain that is left in the grain tank over extended periods of time, such as during storage of the harvester between seasons, will likely spoil. Such spoiled grain will then be discharged from the clean grain tank the next time that the harvester is used, leading to contamination of the freshly harvested grain. Moreover, the spoiling or rotting process of the grain can be corrosive to the components of the clean grain tank that are contacted by the spoiling grain. Over time the clean grain tank can be damaged and require expensive repair. Additionally, any grain that is left accumulated in the grain tank when the harvester is switched between crops will exit the harvester with the next crop being harvested and will be intermingled with grain from the next crop. For example, if the harvester has been used to harvest soybeans early in the fall harvesting season, soybeans will remain in the grain tank and will be intermingled with, for example, corn when it is next harvested by the harvester.

The grain that is trapped in the clean grain tank can be discharged from the harvester if the operator climbs up and enters the clean grain tank to sweep off the accumulated grain from the obstructing components. This is not only inconvenient, but also time consuming. It also poses a significant safety hazard in that the operator must climb the machine and enter the clean grain tank. Operators frequently also ignore the warnings of manufacturers to the contrary and will attempt to clear the trapped grain while the discharge auger is operating. If the operator attempts this unsafe procedure, he may slip or make a misjudgment and be in danger of having parts of his body or clothing caught in the discharge auger.

SUMMARY OF THE INVENTION

The invention consists of filler blocks which are inserted into the clean grain tank of a harvester or combine. The filler blocks occupy spaces in the clean grain tank where grain is otherwise trapped and prevented from being discharged from the clean grain tank. The filler blocks have surfaces which shed grain into areas of the clean grain tank where it is subsequently discharged and thereby prevent the trapping of grain in the clean grain tank.

Accordingly, an object of the present invention is to provide inexpensive filler blocks which can be added to the clean grain tank of existing harvesters to prevent the trapping of grain in the clean grain tank.

Another object of the invention is to provide filler blocks which can be added either during the manufacture of the harvester or as an after-market add on.

These and other objects of the invention will be made apparent to a person of ordinary skill in the art upon a review and understanding of this specification, the associated drawings, and the appended claims.

DETAILED DESCRIPTION OF THE PREFERRED EMBODIMENT

Figure 1:
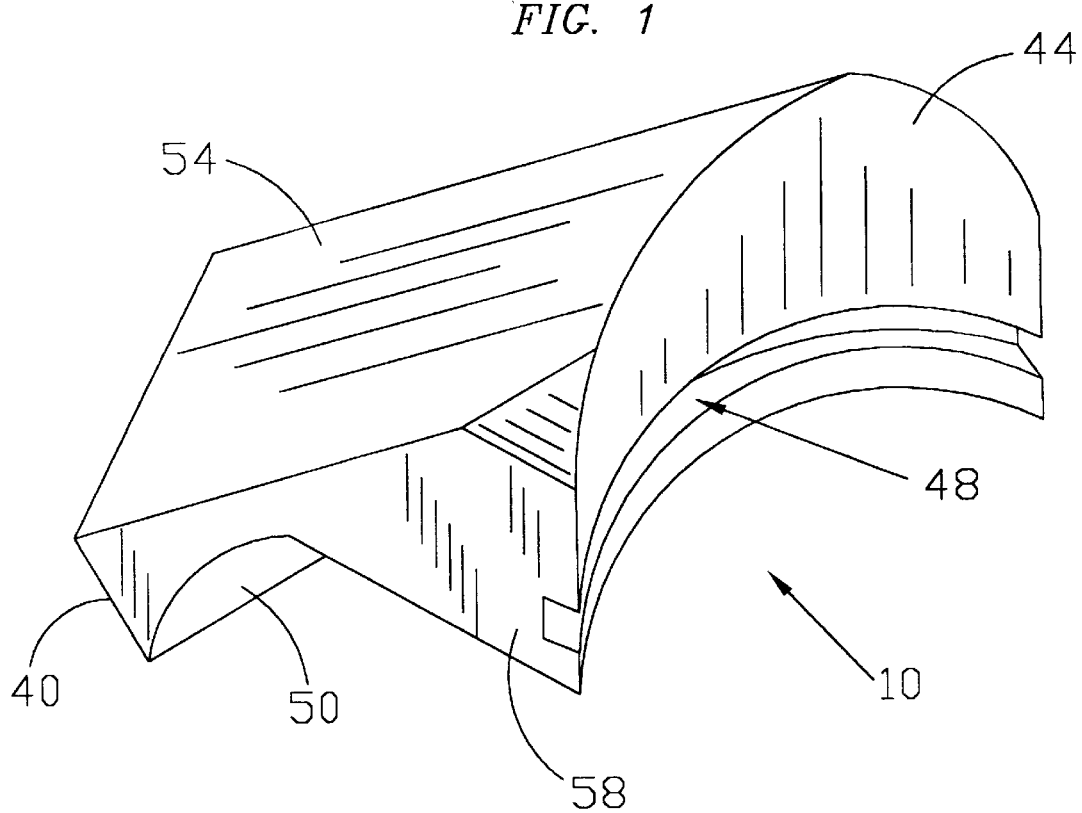
FIG. 1 is a perspective view of a filler block of the present invention.
Figure 2:
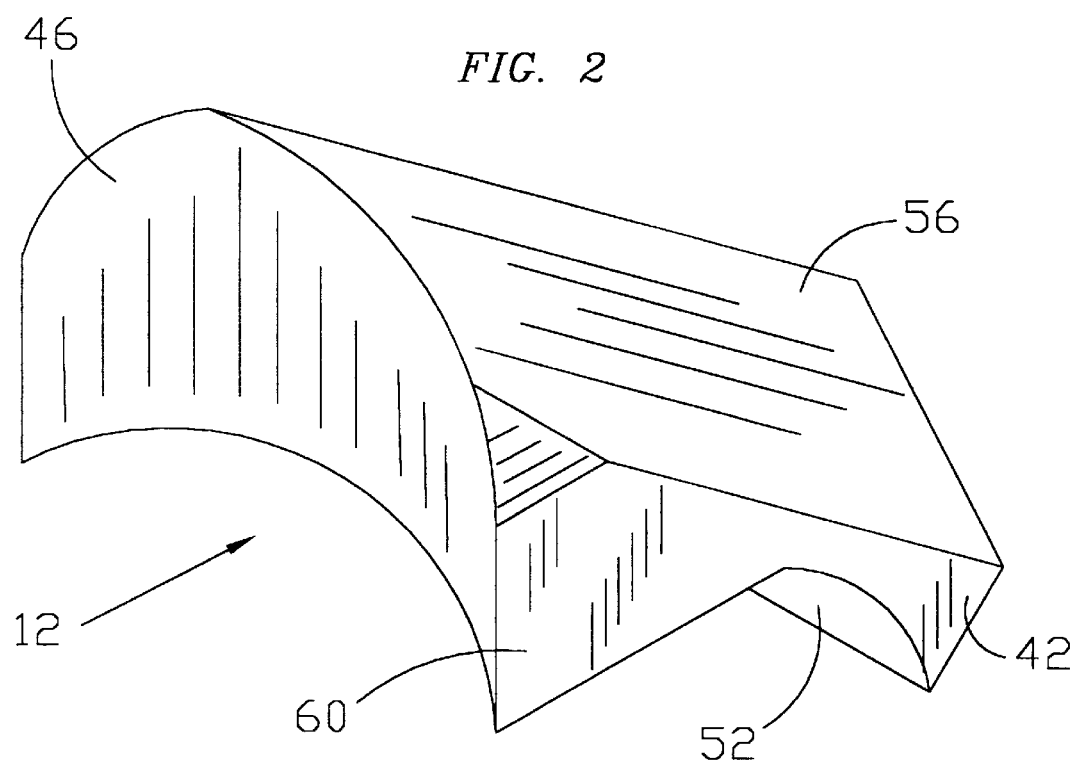
FIG. 2 is a perspective view of a second filler block of the present invention.

The present invention is illustrated in FIGS. 1 and 2, generally at 10 and 12, comprising a first filler block and a second filler block, respectively. The filler blocks 10 and 12 are inserted into a clean grain tank 14 (FIGS. 3 and 4) of a harvester or combine (not shown in full). The clean grain tank 14 represented in FIGS. 3 and 4 is typical of that which is present in combines sold under the International Harvester® and Case IH® brands.

Figure 3:
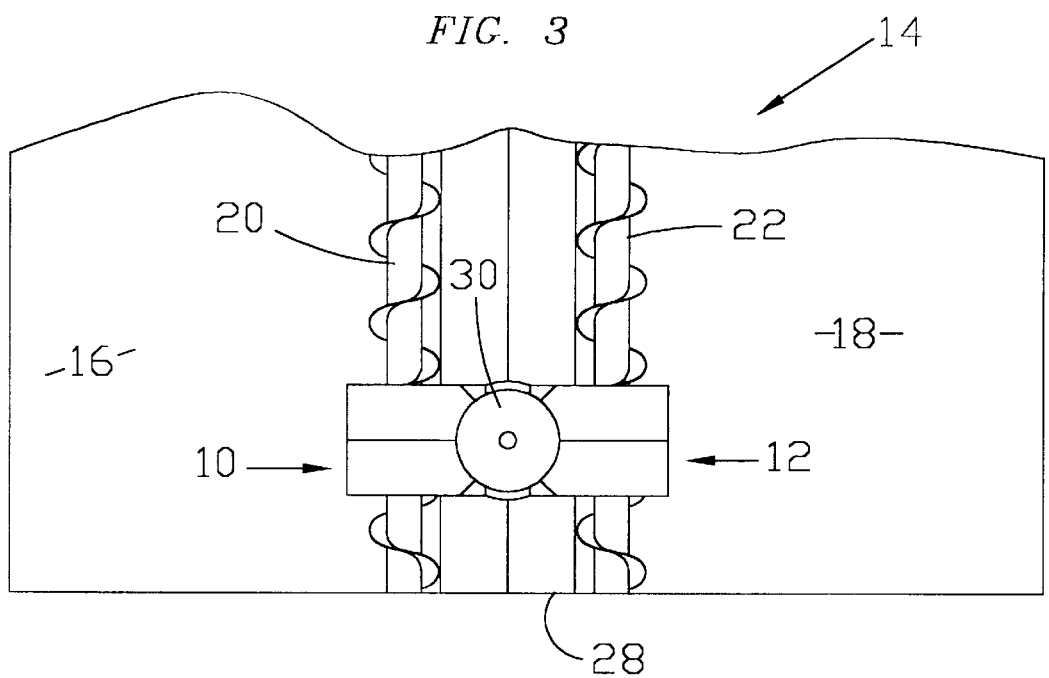
FIG. 3 is a top view of a clean grain tank of a harvester in which first and second filler blocks of the present invention have been added.
Figure 4:
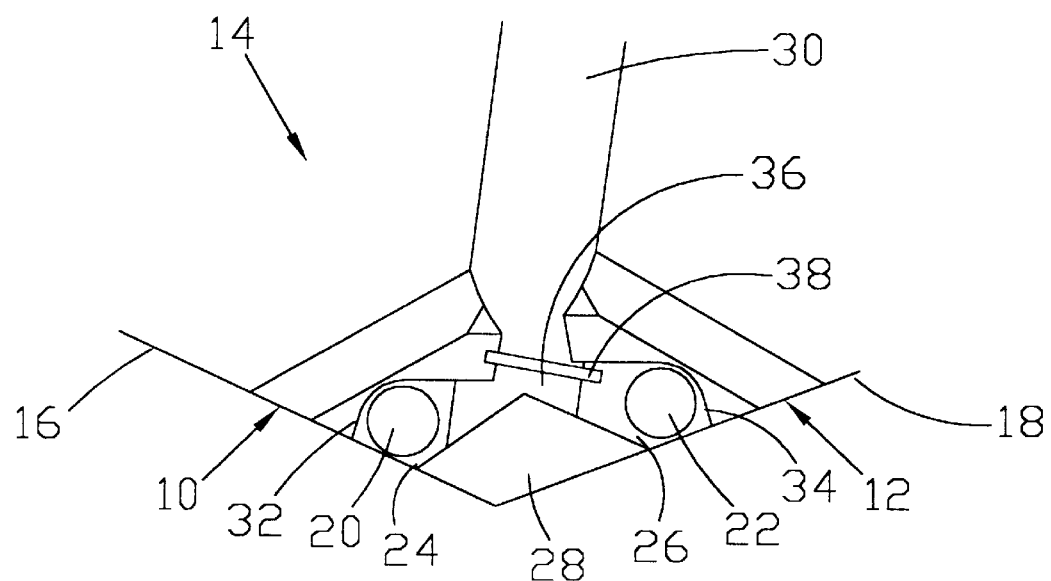
FIG. 4 is a side elevational view of the interior of a clean grain tank showing the first and second filler blocks in operative position.

As can be seen in FIGS. 3 and 4, the clean grain tank 14 includes sloping bottom wall sections 16 and 18 which feed grain in the grain tank toward a pair of centrally located discharge augers 20 and 22. The discharge augers 20 and 22 operate in a corresponding pair of troughs 24 and 26. The space between the discharge augers 20 and 22 at the lowest portions of the clean grain tank 14 is filled with a peaked diverter 28 which serves to direct grain outwardly from between the two augers 20 and 22 towards the augers 20 and 22.

The augers 20 and 22 have sections that are reversely flighted so that grain is fed from the ends of the grain tank toward a central vertical auger 30. Accordingly, grain from the full length of the grain tank is conveyed toward the vertical auger 30 which then picks it up and conveys it upwardly and out of the clean grain tank 14.

As is best illustrated in FIG. 4, sheet metal shrouds 32 and 34 cover the augers 20 and 22 respectively in the area of the vertical auger 30 to assist in the exchange of the grain conveyed by the augers 20 and 22 into the vertical auger 30. In the unmodified grain tanks, grain frequently gets trapped on these shrouds 32 and 34 and will not be conveyed out of the clean grain tank even if it is operated to where no more grain is discharged out of the vertical auger 30. Accordingly, there are dead spaces associated with the shrouds 32 and 34 and other nearby structures which trap grain, fines, dirt, and moisture. These materials will remain in the clean grain tank unless they are manually removed.

In accordance with the present invention, the two filler blocks 10 and 12 are constructed to fill in the dead spaces in this area of the clean grain tank 14 so as to eliminate trapping of grain and other materials so that manually cleaning of the grain tank will no longer be necessary. The filler blocks 10 and 12 may be constructed of any suitable material, such as plastic, metal, fiberglass, resin coated foam, wood, and the like. The filler blocks 10 and 12 present vertical, sloping, or convex surfaces so that grain which comes in contact with them is shed off whereupon it will fall into the discharge augers 20 and 22.

In the preferred embodiment, the filler blocks 10 and 12 are designed to be used in cooperation with the clean grain tank arrangement of International Harvester® and Case IH® combines. As is best illustrated in FIG. 4, the clean grain tank 14 is not entirely symmetrical. The vertical auger 30 has and its bottom or pick end portion attaches to a housing 36 that is tilted. The result is that a flange 38 of the housing 36 is higher at one side of clean grain tank 14 then at the other.

The filler blocks 10 and 12 are constructed so as to cover the dead spaces in the clean grain tank 14 in the area of the shrouds 32 and 34, extending from an associated bottom wall 16 and 18 inwardly and upwardly toward the vertical auger 30. Accordingly, the lower, outward end face 40 and 42 of the filler blocks 10 and 12, respectively, is at an angle to be closely adjacent to the sloping bottom wall sections 16 and 18, respectively, whereas the inward, upper surfaces 44 and 46 are curved to conform to the curved contour of the outer surface of the vertical auger 30. Additionally, as the first filler block 10 is used on the side of the clean grain tank 14 where the flange 38 projects higher, it is formed with a groove 48 in which the flange 38 is received when the filler block 10 is in its operative position as illustrated in FIG. 4. The bottom surfaces 50 and 52 of the filler blocks 10 and 12, respectively, are formed to conform closely to the upper surfaces of the shrouds 32 and 34. The top surfaces 54 and 56 of the filler blocks 10 and 12, respectively, are of a shape which is higher in the center and slopes downwardly toward either side so as to shed grain off of the filler blocks 10 and 12 to avoid it becoming trapped. Construction of the filler blocks 10 and 12 is completed by side wall portions 58 and 60 which thereby create a closed interior and prevent grain and other materials from entering the dead space. The filler blocks 10 and 12 may be secured in the clean grain tank 14 by any method consistent with their manufacture, such as screws, glue, mastics or the like. Further, the filler blocks can be inserted in the clean grain tank either during the original manufacturing and assembly of the harvester or by a dealer or operator in an after market situation.

Although the invention has been described with respect to a preferred embodiment thereof, it is to be also understood that it is not to be so limited since changes and modifications can be made therein which are within the full intended scope of this invention as defined by the appended claims.

What is claimed is:

1. A grain storage tank with at least one filler block, said combination comprising:

a grain storage tank with a bottom wall section;

a generally horizontal auger located above said bottom wall section for moving grain generally horizontally along said bottom wall section;

a generally vertical auger interacting with said horizontal auger to move grain generally vertically out of said grain storage tank;

a shroud covering at least a portion of said horizontal auger thereby forming a dead space that traps grain and other material from contact with said horizontal auger; and a filler block located above said shroud and over said dead space and shaped to divert grain and other material away from said dead space.

2. The invention in accordance with claim 1 further comprising a first and a second horizontal auger.

3. The invention in accordance with claim 2 further comprising a first and a second filler block, wherein said first filler block diverts grain and other material away from said dead space over said first horizontal auger and said second filler block diverts grain and other material away from said dead space over said second horizontal auger.

4. A grain storage tank with two filler blocks, said combination comprising:

a grain storage tank with a first and second downward sloping bottom wall sections forming a generally U-shaped trough;

a first and a second horizontal auger located side by side and above said generally U-shaped trough, said augers for moving grain horizontally along said bottom wall sections;

a vertical auger interacting with said horizontal auger to move grain generally vertically out of said grain storage tank;

a shroud covering at least a portion of said first and second horizontal augers at said area of interaction between said vertical and horizontal augers, thereby forming a dead space that traps grain and other material from contact with said horizontal augers;

a first filler block located above said shroud and over said dead space, said first filler block having a first end surface forming to said first downward sloping bottom wall section, a second end surface forming to a first side of said vertical auger, a bottom surface forming to a portion of said shroud covering said first horizontal auger, and a top surface shaped to divert grain and other material away from said dead space; and a second filler block located over said dead space, said second filler block having a first end surface forming to said second downward sloping bottom wall section, a second end surface forming to a second side of said vertical auger opposite said first side of said vertical auger, a bottom surface forming to a portion of said shroud covering said second horizontal auger, and a top surface shaped to divert grain and other material away from said dead space.

* * * * *